United States Patent
Vernia et al.

(10) Patent No.: US 10,833,925 B2
(45) Date of Patent: Nov. 10, 2020

(54) ATTACHMENT OF A LOGICAL NETWORK TO A VIRTUAL MACHINE

(71) Applicant: Red Hat Israel, Ltd., Raanana (IL)

(72) Inventors: Lior Vernia, Tel Aviv (IL); Eldan Shaul Hildesheim, Kadima (IL)

(73) Assignee: Red Hat Israel, Ltd., Raanana (IL)

( * ) Notice: Subject to any disclaimer, the term of this patent is extended or adjusted under 35 U.S.C. 154(b) by 316 days.

(21) Appl. No.: 14/630,168

(22) Filed: Feb. 24, 2015

(65) Prior Publication Data

US 2016/0248626 A1 Aug. 25, 2016

(51) Int. Cl.
*H04L 12/24* (2006.01)
*H04L 12/803* (2013.01)

(52) U.S. Cl.
CPC ...... *H04L 41/0806* (2013.01); *H04L 41/0886* (2013.01); *H04L 41/0893* (2013.01); *H04L 47/125* (2013.01)

(58) Field of Classification Search
CPC ............ H04L 41/0806; H04L 41/0886; H04L 41/0893; H04L 47/125
USPC ........................................................ 709/220
See application file for complete search history.

(56) References Cited

U.S. PATENT DOCUMENTS

| | | | |
|---|---|---|---|
| 7,752,635 B2 | 7/2010 | Lewites | |
| 8,315,156 B2* | 11/2012 | Droux | H04L 45/245 370/216 |
| 8,386,642 B2 | 2/2013 | Elzur | |
| 8,713,202 B2 | 4/2014 | Droux et al. | |
| 8,838,756 B2 | 9/2014 | Dalal et al. | |
| 2005/0234931 A1* | 10/2005 | Yip | H04L 41/0816 |
| 2007/0101323 A1 | 5/2007 | Foley et al. | |
| 2007/0268516 A1* | 11/2007 | Bugwadia | H04L 41/0886 358/1.15 |
| 2008/0310419 A1* | 12/2008 | Bansal | H04L 45/00 370/395.6 |
| 2011/0022694 A1* | 1/2011 | Dalal | H04L 41/0843 709/222 |
| 2011/0035494 A1 | 2/2011 | Pandey et al. | |
| 2011/0055364 A1* | 3/2011 | Heim | H04L 41/0806 709/223 |
| 2011/0055824 A1* | 3/2011 | Benari | G06F 9/455 717/176 |
| 2012/0002535 A1* | 1/2012 | Droux | H04L 45/245 370/216 |

(Continued)

OTHER PUBLICATIONS

John Savill, "Understanding Hyper-V Networking with System Center Virtual Machine Manager 2012 R2," Hyper-V Content from Windows IT Pro, Feb. 21, 2014, [retrieved Dec. 23, 2014], 6 pages, Internet: <http://windowsitpro.com/hyper-v/understanding-hyper-v-networking-system-center-vmm-2012-r2>.

(Continued)

*Primary Examiner* — Mohamed A. Wasel
*Assistant Examiner* — Patrick F Ngankam
(74) *Attorney, Agent, or Firm* — Lowenstein Sandler LLP (57) ABSTRACT

A request to attach a logical network to a virtual machine is received. The cluster associated with the virtual machine is identified. The cluster includes a plurality of hosts. A host interface of each host of the plurality of hosts in the cluster is identified in view of an interface selection policy. The host interface of each of the hosts of the plurality of hosts in the cluster is assigned to the logical network.

20 Claims, 6 Drawing Sheets

(56) References Cited

U.S. PATENT DOCUMENTS

2012/0084406 A1* 4/2012 Kumbalimutt ...... H04L 12/4641
709/220
2013/0103809 A1* 4/2013 Kumbalimutt ...... H04L 12/4641
709/220

OTHER PUBLICATIONS

Serdar Cabuk et al., "Towards Automated Provisioning of Secure Virtualized Networks," CCS '07, Oct. 29-Nov. 2, 2007, [retrieved Dec. 23, 2014],12 pages, Internet: http://www.hpl.hp.com/techreports/2007/HPL-2007-139.pdf>.

No Author, "Managing Networks and Traffic," CloudStack Administration, [retrieved Dec. 23, 2014], 97 pages, Internet: http://cloudstack-administration.readthedocs.org/en/latest/networking_and_traffic.html>.

* cited by examiner

ATTACHMENT OF A LOGICAL NETWORK TO A VIRTUAL MACHINE

TECHNICAL FIELD

Aspects of the disclosure generally relate to virtual machines and, more specifically, relate to attaching a logical network to a virtual machine.

BACKGROUND

Generally, the concept of virtualization allows multiple instances of one or more operating systems to run on a single system, even though each operating system (OS) is designed to have complete and direct control over the system and its resources. Virtualization is typically implemented by using software (e.g., a virtual machine monitor, or a "VMM") to present to each OS a virtual machine (VM) having virtual resources, including one or more virtual processors, that the OS may control, while the VMM maintains a system environment for implementing virtualization policies among the VMs (i.e., the virtualization environment). VMs may run on one or more host machines.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the present disclosure relate to virtual machines and, more specifically, relate to attaching a logical network to a VM.

A host is a physical server that runs or executes one or more VMs. Hosts are grouped into clusters where each cluster may be a set of physical servers or hosts that provides computing resources for VMs. Hosts may be arranged in a cluster that includes multiple hosts that share the same network resources. The clusters of hosts may be assigned to a data center that is a logical entity that defines the set of physical and logical resources that are used to provide computing resources for the VMs. The data center may be considered a container with clusters of hosts, VMs to be executed by the hosts, storage resources, and/or network resources.

The network resources of the data center may be represented by logical networks. For example, a logical network may be a group of at least two network resources, such as network interface cards (NICs) of the hosts or network ports (e.g., an Ethernet port) that are physically connected. A logical network may be considered a logical representation of physical network resources (e.g., NICs and storage devices). Each logical network may group network traffic and communication between a management server of the data center, hosts, storage and network resources, and VMs. As such, logical networks may be assigned to a host of the data center to facilitate network communication (e.g., access of resources by VMs between hosts).

Each host may include multiple host interfaces (e.g., NICs). The logical networks of the data center may be assigned to a host by the assigning of the logical network to one of the host interfaces of the host. Furthermore, multiple logical networks can share a single host based on the number of available host interfaces (e.g., NICs). Additionally, a host may include multiple host interfaces where each host interface is assigned to a different logical network. As an example, a first host interface of the host may be assigned to a first logical network and a second host interface of the same host may be assigned to a second logical network. A single host interface may also be assigned to multiple logical networks.

As previously described, a VM may be attached to a logical network that may provide certain functionality and shared resources within the logical network. For example, the logical network may connect the VM at a host to another host in the cluster to allow access operations to the other host (e.g., network access, access to external networks etc.). In order for the VM to successfully access each host in the cluster, a host interface of each of the hosts in the cluster must be assigned to the same logical network. Thus, for a user of the data center to run a VM in a cluster while retaining the logical network functionality, a host interface for each of the hosts in the cluster is assigned to the same logical network. A logical network may be considered to be operational when it is assigned to a host interface (i.e., an active NIC) on all hosts in the cluster.

An administrator of the data center may manually configure a host interface for each host of the cluster to assign the logical network. For example, the administrator may assign a host interface from at least two hosts of the cluster to the same logical network. The data center may include a large number of hosts, VMs, logical networks, and other such resources. For such a large amount of resources, the manual process of selecting host interfaces may be cumbersome, error prone, and time-consuming for the administrator. Instead, automated assignment of the host interfaces of each host in a cluster may decrease administrative overhead and management time as well as improve system performance. An interface selection policy may be used for attaching a logical network to a VM in a data center. The interface selection policy can dynamically select and assign a host interface of each host that is in the cluster that includes or is associated with the VM. The automated selection of host interfaces facilitates assigning two or more hosts in the cluster to the logical network, thereby, directly attaching the VM to the logical network to enable VM functionality between the hosts.

The assignment of host interfaces may be governed by an interface selection policy. The interface selection policy may use one or more conditions to identify a host interface for each host in a cluster to be assigned to a logical network. For example, if a host interface satisfies conditions of the interface selection policy, then the host interface may be assigned to the logical network. Examples of conditions of the interface selection policy include, but are not limited to, load balancing conditions, physical network conditions, and/or network configuration information.

In one implementation, when creating a new logical network to be used in the data center, a VM may be subsequently (e.g., directly after creating the logical network) attached to the new logical network without manual configuration of host interfaces. A host may be assigned to the new logical network by identifying a host interface in view of the interface selection policy. The interface selection policy can be applied to each host in the cluster for the new logical network.

Furthermore, a status message can be sent to inform the administrator of the data center if the host assignment to a logical network was assigned for the attachment of the logical network to a VM. Aspects of the present disclosure may further utilize a graphical user interface (GUI) to allow an administrator to automatically attach a logical network to a VM. Thus, the intelligent assigning of a logical network to hosts in a cluster via selection of host interfaces of the hosts may reduce administrative tasks for the administrator of a data center.

Figure 1:
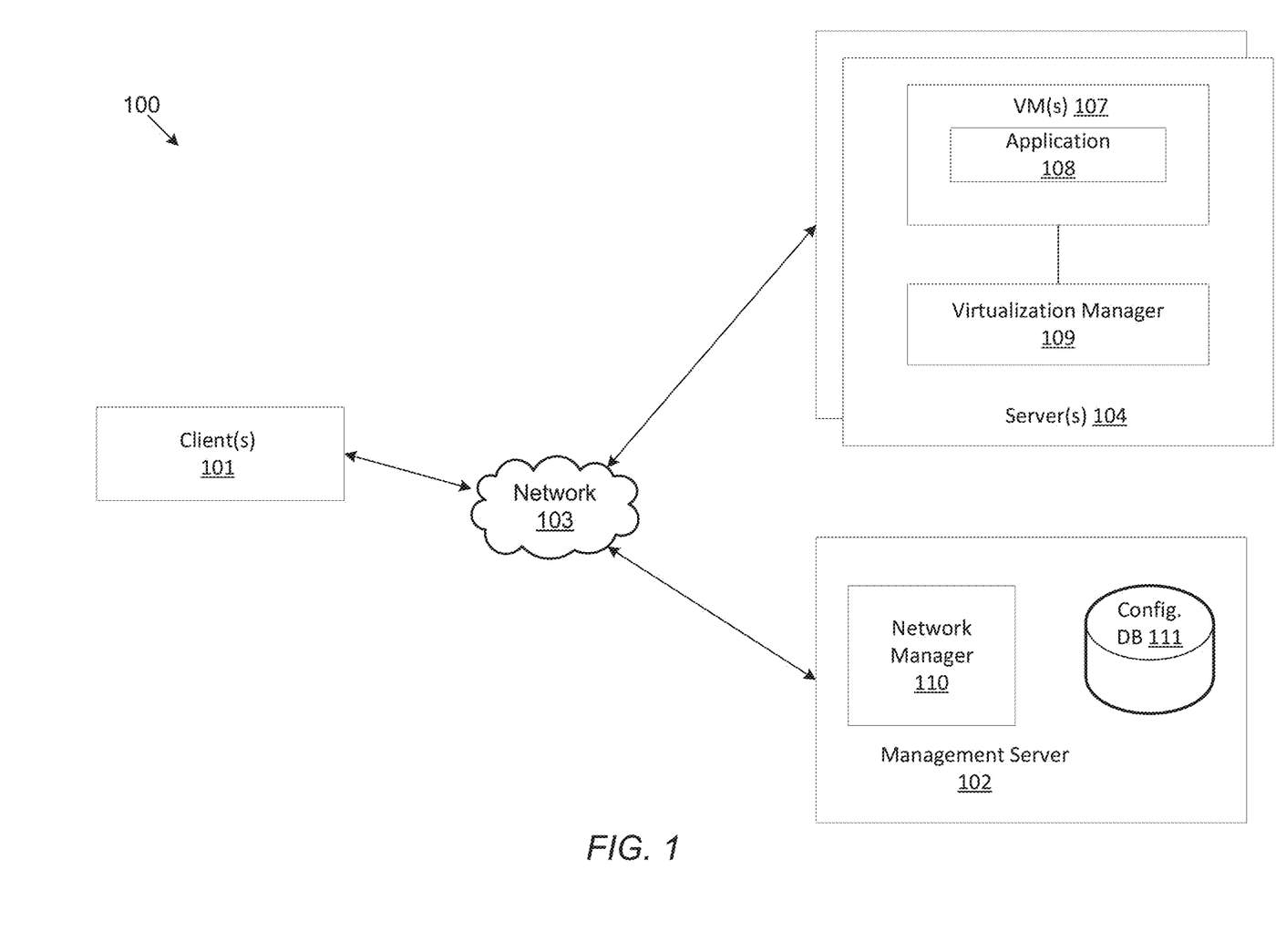
FIG. 1 illustrates an example system architecture in which implementations of the disclosure may operate.

FIG. 1 is an example system architecture for various implementations of the disclosure. In one implementation, the system architecture is a data center 100. The data center 100 can include, but is not limited to, one or more clients 101 communicatively coupled to a cluster of servers 104 over a physical network 103. Network 103 can be a local area network (LAN), a wide area network (WAN), or a combination of one or more physical networks.

Client 101 can be a computer system in communication with servers 104 for remote execution of applications at servers 104. Thus, input data representing application commands is received at the client 101 and transferred over physical network 103 to servers 104. In response to receiving the input data transmitted by the client 101, an application (e.g., desktop application) can generate output display commands. The output display commands can then be transmitted from the servers 104 to the client 101 for rendering at a display device of the client 101. Note that a desktop application is utilized herein as an example; however, any other application can also be applied.

The servers 104 may host one or more VMs 107, each VM having one or more desktop or server applications 108 (e.g., an operating system). Application 108 can be executed and hosted by an operating system within VMs 107. Such an operating system in VM 107 is also referred to as a guest operating system. Multiple guest operating systems and the associated VMs can be controlled by another operating system (also referred to as a host OS). A host OS can represent a VM monitor (VMM), also referred to as a hypervisor, for managing the hosted VMs. A guest OS can be of the same or different type with respect to the host OS.

VM(s) may include virtual network resources such as virtual network interface cards (VNICs). Network resources of the one or more hosts may be configured to be used by each of the VM(s). For example, networking components (such as Ethernet port) may be configured with addresses and identifiers so that the OS of the host may know where and how to communicate with the networked devices. A cluster is a set of physical hosts that are a resource pool for VMs. Hosts in a cluster can share the same network infrastructures and storage.

The servers (i.e. hosts) 104 may be coupled to multiple networks (physical or logical networks). An example of a network may include a virtual local area network (VLAN). A single physical NIC can have multiple VNICs logically connected to it. A VNIC acts as a physical network interface for a virtual machine. NICs and VNICs can be distinguished based on unique addresses or identifiers.

Servers 104 can be managed by a management server 102, which can be a separate machine or part of the machine hosting server. For example, server 104 can be implemented as a virtual desktop server (VDS) while management server 102 can be implemented as a VDC (virtual desktop control) server. The network manager 110 of the management server 102 may remotely configure servers 104. For example, certain software components of the servers 104 may be remotely configured via network manager 110 of management server 102. The network manager 110 can communicate with a virtualization manager 109 (e.g., VDSM) for remote configuration of servers 104. The configuration information associated with the servers 104 is stored in configuration database 111.

VLANs are optionally implemented to enhance security, fault tolerance, and network capacity. A NIC can support multiple logical networks using VLAN tagging to isolate network traffic. VLAN tagging is supported by configured network information that may include a VLAN identifier (e.g., VLAN tag), maximum transmission unit (MTU) size, type (e.g., bridged or non-bridged), spanning tree protocol (STP) status (e.g., enabled, disabled, or not applicable), classification (e.g., VM network, storage network, and/or management network), and/or name.

Figure 2:
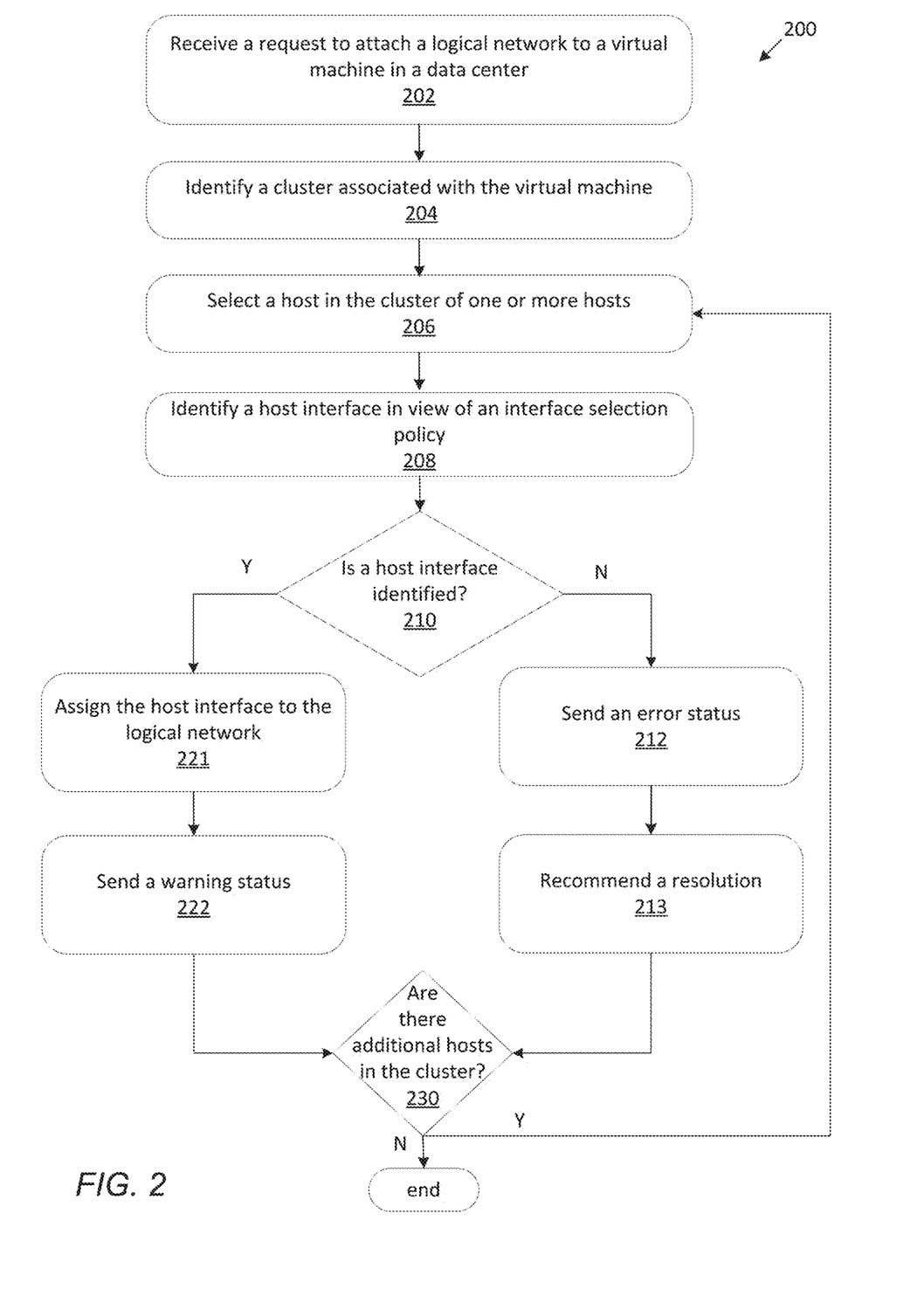
FIG. 2 is an illustrated example method to attach a logical network to a virtual machine in accordance with some implementations of the disclosure.

FIG. 2 illustrates a flow diagram of an example method 200 to attach a logical network to a VM. The method 200 can be performed by processing logic that includes hardware (e.g., circuitry, dedicated logic, programmable logic, microcode, etc.), software (such as instructions run on a processing device), or a combination thereof. As one example, the method can be performed by the network manager 110 running on the management server 102 of FIG. 1.

The method 200 may begin with the processing logic receiving, at block 202, a request to attach a logical network to a VM in a data center. For example, a network manager may identify an existing logical network that is currently used in the data center. In another implementation, the processing logic can create a new logical network. For example, the user (e.g., an administrator of the data center) can choose to add a new logical network in the data center that is to be directly attached to the VM. In response to identifying the logical network to attach to the VM, the processing logic can determine configuration information associated with the VM. Configuration information can be used to identify a cluster of a data center that includes the VM and one or more hosts in each of the clusters. The configuration information can include configuration details of network resources (e.g., clusters, hosts, network switches, bridges, host interfaces,) such as device labels, quality of service, port types, network layout, etc. Configuration information can be retrieved from storage (e.g., a database), from monitored network traffic, and/or from a network discovery request. In another implementation, the user can request a new VM to be executed in the data center, such as with a VM template or otherwise.

At block 204, the processing logic identifies a cluster associated with the VM where the cluster includes multiple hosts. At block 206, the processing logic selects each host of the cluster to assign to the logical network. For example, the processing logic may select a first host of the cluster at random, in alphanumerical order of a host identifier, or any other number of ways.

At block 208, the processing logic identifies a host interface in view of an interface selection policy. The interface selection policy may be used to select a host interface using one or more conditions. The processing logic can include multiple interface selection conditions, such as, heuristics, configuration information (e.g., quality of service, routing tables, network layout, VLAN tagging, etc.) and/or a selection parameter. For example, the host interface of the host can be identified in view of a history of network traffic, power consumption, fault tolerance, link aggregation, etc. For example, the interface selection policy can identify the host interface based on performance of a host interface of a host with multiple host interfaces.

In an illustrative example, the interface selection policy may be a load-balancing policy designed to select a host interface based on historical traffic across multiple host interfaces of a host in the cluster. For example, historical network traffic for a host may report that a first host interface of the host receives more traffic than a second host interface of the host. The selection policy can identify the second host interface as having greater capacity (e.g., network communication bandwidth) than the first host interface to assign to the logical network.

In another example, a condition of the interface selection policy may be configuration information, such as, VLAN tagging. In the data center having multiple physical networks, a host may have multiple host interfaces connected to different physical networks, logical networks and/or virtual networks. A host interface of the host can be configured for various types of network communication, and/or assigned to different logical networks. A host interface with multiple logical networks assigned can use VLAN tagging to direct traffic to and from the multiple logical networks assigned to the host interface. The interface selection policy can use VLAN tagging as a condition to identify the host interface to assign to the logical network.

A VLAN tag identifies the VLAN associated with the virtual network for packet transmission. The interface selection policy using VLAN tagging as a condition can be satisfied by a host interface having one logical network without a VLAN tag assigned. The host interface can support multiple logical networks with VLAN tags and one logical network that does not include a VLAN tag. In some embodiments, a logical network may be associated with a VLAN network or may not be associated with a VLAN network. The logical network may be associated with a VLAN network by the use of VLAN tags that identify a VLAN network. For example, the logical network may be associated with a first VLAN network and a second VLAN network. Network traffic (e.g., packets) may be routed via the logical network by using the VLAN tags to identify the VLAN network. For example, networkpacket1 can be recognized and routed for network resources of vlan1. A networkpacket2 can then be recognized and routed for network resources of vlan2. Thus, the VLAN tags can be used to route or direct network packets to an appropriate destination (e.g., a VM). In some implementations, a logical network is associated with a non-VLAN network, and the host interface may capable of directing network traffic for a single network that does not have a VLAN. For example, a host interface may support no more than one logical network without a VLAN tag at a time.

The processing logic can determine if more than one logical network lacks a VLAN tag for each host interface of a host. For example, a host interface with previously assigned logical networks that include VLAN tags can support an additional logical network that includes a VLAN tag or a logical network that does not include a VLAN tag. The host interface supports no more than one logical network without a VLAN tag and therefore the condition of the interface selection policy is satisfied. In another example, a host interface with previously assigned logical networks that includes a logical network without a VLAN tag may support an additional logical network that does not include a VLAN tag. In this example, the host interface does not satisfy the condition of the selection policy if the logical network being assigned includes a VLAN tag. Thus, the host interface is assigned no more than one logical network without a VLAN tag. For a host with multiple host interfaces, the processing logic can determine if each host interface of the multiple host interfaces satisfies the condition of the interface selection policy to identify the host interface to assign to the logical network to attach to the VM.

Alternatively, the interface selection policy may receive a selection parameter from a user to determine an optimal host interface to select. In another example, assigning host interfaces to the logical network for attachment to a virtual machine can be in view of a pre-defined ordered list. In one implementation, the interface selection policy may select the host interface in view of the number of virtual machines and/or logical networks assigned to the host. The interface selection policies described herein are illustrative examples only, and do not in any way limit the scope of the present disclosure. The interface selection policy can be used to repeat selecting a host interface for each host in the cluster in the data center to assign to the logical network.

At block 210, the processing logic can determine if a host interface of the host is identified. If a host interface for the selected host is not identified at block 208 to assign to the logical network for attaching to the VM, the processing logic may, at block 212, send an error status message indicating that a host interface was not assigned for the selected host. For example, the status message can identify that the logical network assignment to the host was not accepted and/or details of the host, host interfaces, and/or networks. In one implementation, the status message can display information identifying that the assignment of the logical network to the host was not accepted as an error to indicate to the user to manually complete a configuration of the host with the logical network. At block 213, the processing logic can recommend a resolution via a GUI as described below with respect to FIGS. 4A-4B.

If the processing logic identifies a host interface in view of the selection policy, then the processing logic may further, at block 221, assign the identified host interface to the logical network in view of the interface selection policy. For example, the processing logic can assign the selected host interface by storing an identifier of the host interface with the requested VM identifier, and the requested logical network identifier, in a data store of the data center (e.g., configuration database 111 of FIG. 1). For example, the stored data can be used to route traffic for logical network 'blue' attached to VM1 associated with Cluster_3 to Host_a via host_a_interface_4. The assignment of the host interfaces allows the logical network to become operational and enable the VM functionality between the hosts.

At block 222, the processing logic sends a status message that can be stored or displayed to the user via the GUI. The status message can indicate a successful assignment and/or a warning to indicate that the host was assigned to the logical network and the host interface of the host was assigned to the logical network via processing logic. In one implementation, the status message can display details of the interface selection process.

At block 230, the processing logic continues to select each host in the cluster to assign a host interface of each host to the logical network. The host interface selection process (e.g., blocks 206-230) may be performed and repeated for each of the multiple hosts of the cluster in the data center. Although described sequentially, the steps for each of the multiple hosts can occur simultaneously. The processing logic may check if there are additional hosts in the cluster to assign or can end the intelligent configuration for attachment of the VM to the logical network if there are no additional hosts in the cluster for assigning to the logical network.

As such, a logical network may be attached to a VM, an indication is received from a user to select the VM and select the logical network or newly created logical network. Then a cluster that includes the VM is determined and hosts of the cluster are identified to assign to the logical network by selecting a host interface of each host that is selected in view of the interface selection policy. Furthermore, the processing logic can assign a host interface for each host in the cluster that includes the VM belongs to the logical network. Additionally, a status message may be sent to indicate if the assignment of each host to the logical network was accepted.

Figure 3:
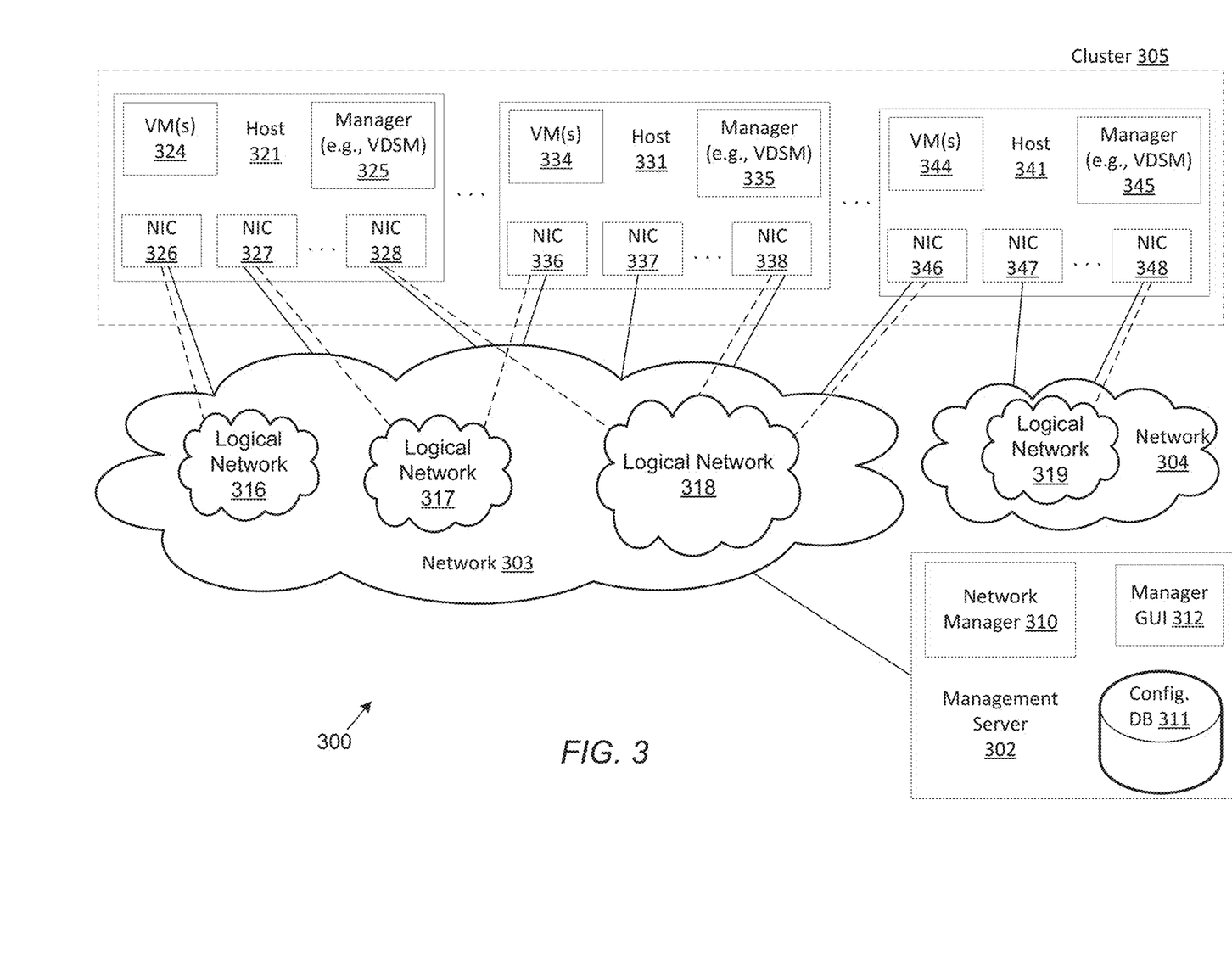
FIG. 3 is a block diagram of an example environment to attach a logical network to a virtual machine in accordance with some implementations of the disclosure.

FIG. 3 is a block diagram illustrating an example environment to attach a logical network to a virtual machine. The environment may correspond to a data center 300 that include hosts 321, 331, and 341, management server 302, and physical networks 303 and 304. Network manager 310 can attach a logical network to a VM by assigning the host interfaces of hosts in the data center 300 to a particular logical network without manually selecting host interfaces. For example, the network manager 310 receives a VM 334 identifier and logical network 318 identifier which the network manager 310 uses to identify the cluster 305 that includes the VM 334, as well as network configuration information such as a VLAN tag. In one implementation, hosts 321, 331, and 341 may be implemented as part of a cluster 305 associated with server 104 and management server 302 may be implemented as part of server 102 of FIG. 1.

Referring to FIG. 3, hosts 321, 331, and 341, and management server 302 are communicatively coupled to each other over one or more physical networks 303 and/or 304. Each of the hosts 321, 331, or 341 may include one or more network interfaces (also referred to as host interfaces or network interface cards) and executes one or more VMs. In this example, host 321 includes NICs 326-328 and executes one or more VMs 324. Each NIC 326-328, 336-338, 346-348, may be associated with one or more VMs hosted by each respective host 321, 331, or 341.

In this example, NIC 326 is coupled to logical network 316, NIC 327 is coupled to logical network 317, and NIC 328 is coupled to logical network 318. Each of the logical networks 317-319 is associated with a network identifier (e.g., network name) that identifies the respective logical network. Multiple NICs may be coupled to the same or different logical networks dependent upon the network configuration. According to one implementation, after a logical network is associated with a VM, management server 302 selects a host interface for each host in the cluster that includes the VM. In an implementation, managers (e.g., VDSM) 325, 335, and/or 345 of hosts 321, 331, and/or 341 can use the interface selection policy and transmit host interface identifiers to network manager 310. In one implementation, the interface selection policy can be selected by an administrator or obtained from configuration database 311.

Network manager 310 can attach the logical network to the VM by assigning more than one host in the cluster to the logical network. The network manager 310 attempts to assign each of the hosts in the cluster that includes the VM by selecting an identified host interface for each host and assigning the host interfaces to the requested logical network. In one implementation, one or more logical networks 316, 317, 318, or 319 may be specified to attach to one or more VMs 324, 334, and/or 344 using a manager GUI 312. Once the VMs 324, 334, 344 and the logical network 316, 317, 318, and/or 319 are specified, the network manager 310 can identify the cluster 305 of the specified VM. For example, the network manager 310 can identify the specified VM (e.g., 324) and determine the cluster (e.g., 305) from monitored network information or store information in configuration database 311. Then, each host 321, 331, and 341 in the cluster 305 is determined via configuration database 311.

Network manager 310 applies an interface selection policy to select a host interface of each host to assign to the specified logical network in view of the interface selection policy. For example, the network manager 310 selects a host interface for each host in the cluster 305 of the VM (e.g., 321). According to one implementation, the network manager 310 determines the host interfaces that satisfy a condition of the interface selection policy (e.g., 336, 337, and 338). The network manager 310 uses an interface selection policy to identify a host interface (e.g., 336) that to be assigned the logical network. For example, host interfaces are identified that have no more than one VLAN without a VLAN tag. The interface selection policy can be used to select the host interface of the identified host interfaces for the logical network.

The assigned host interface is stored in configuration database 311 of management server 302. Once an additional host in the cluster 305 is assigned to the same logical network (e.g., 317 or 318) in the cluster (e.g., 305) of the VM, the VM is enabled and can communicate to another host with a host interface assigned to the same logical network (e.g., 317 or 318). For example, a host interface may be identified by manager 325 (such as VDSM manager) of host(s) 321 and transmitted to network configuration unit 310 of management server 302. In one implementation, the interface selection policy may be specified according an application programming interface (API) such as the VDSM API. The VDSM manager of host 321 may parse network configuration information and apply the interface selection policy specified. In this way, NICs may be efficiently configured.

A status message of the assignment can be presented via manager GUI 312. For example, a status message can indicate an error if a host has no host interface that satisfied the condition of the interface selection policy. In another example, a logical network 318 can be specified to attach to a VM 324, 334, or 344 and network manager 310 can apply the selection policy to assign available NICs 328, 338, and 348 of network 303 for each of the respective hosts 321, 332, 334 of cluster 305. In this example, the selection policy can select the host interface to assign, such as NIC 338. Directly attaching the logical network to the VM by the network manager 310 reduces the burden on the administrator to configure host interfaces prior to using the VM. A host interface for each host is assigned to the logical network without user input specifying the host interface.

In another example, network manager 310 can report a status message to indicate an error via the manager GUI 312 for host 321 and host 331 in relation to logical network 319 for failing to satisfy a physical network condition of the interface selection policy. In response to one or more of the hosts of the cluster not having a host interface identified, network manager sends the status to the manager GUI 312 so the administrator can manually configure or troubleshoot.

Figure 4A:
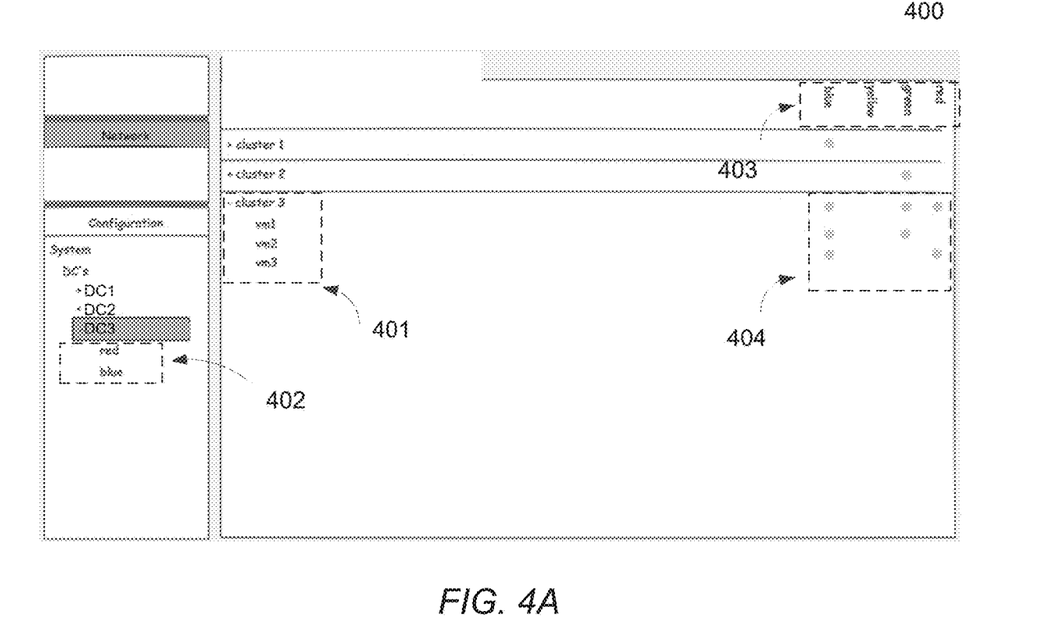
FIGS. 4A-4B are example graphical user interfaces in accordance with some implementations of the disclosure.
Figure 4B:
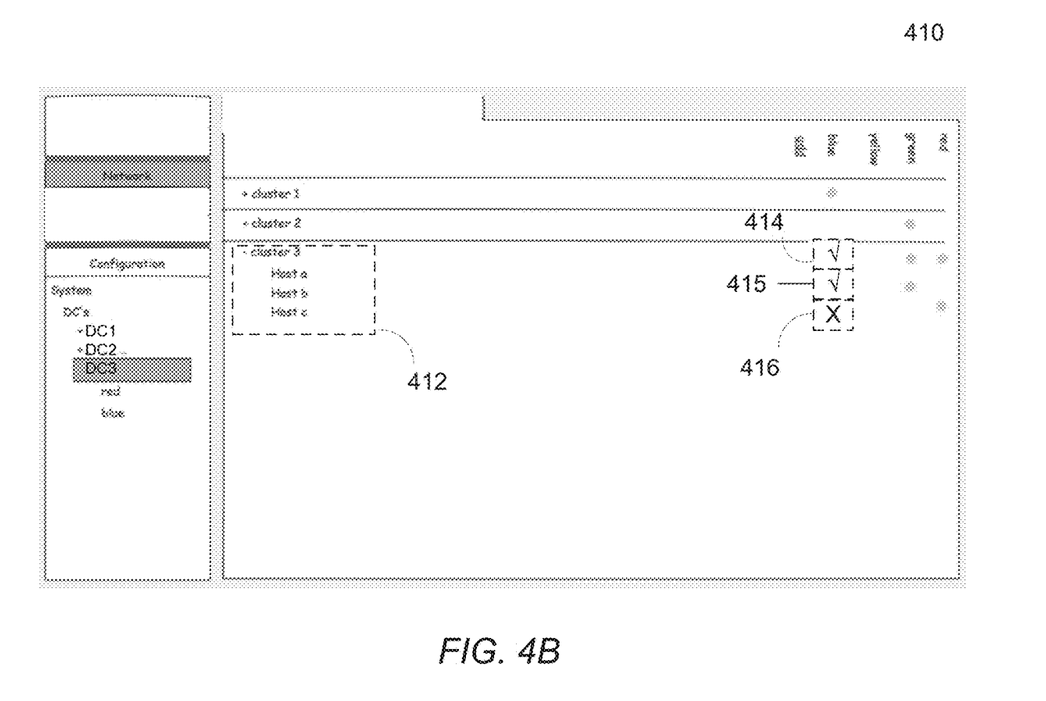

FIGS. 4A-4B illustrate example GUIs 400 and 410 of an attachment tool. The GUI 400 shows a system architecture of the logical networks 402 navigable based on data center. For example, the data center be presented as a hierarchical view that allows the user to navigate among the data centers (e.g., DC1, DC2, DC3) and one or more logical networks 402 of the data center (e.g., red, blue). VMs 401 can be attached to logical networks 402 in an interactive action. For example, VM 401 is dragged and dropped to a logical network 402 to attach the VM to the logical network. In one implementation, logical network 402 is dragged and dropped to VM 401 to attach the VM to the logical network. The GUI 400 provides an intuitive tool for a user to attach the VM to the logical network. The user can repeat the interaction to attach a VM 401 to one more additional logical networks 402 of the data centers. In one implementation, GUI 400 shows one or more VMs 401 to attach to one or more logical networks 402 and displays a status of the host interface assignment 404. VMs 401 can be arranged as a list, tree, or other navigation means and are accessible to be selected and associated with one or more of the logical networks 402. For example, VMs 401 (e.g., vm1, vm2, vm3) can be arranged as an expandable cluster tree. The user can select a VM 401 from the user interface to attach to a logical network in display area 402.

In one implementation, GUI 400 includes a selection policy area (not shown) for the user to select an interface selection policy or set a condition of the interface selection policy that is used to select host interfaces to assign to the logical network 402. In one implementation, the interface selection policy can be a default selection or selected by the processing logic in view of the data center, cluster, or host. The processing logic receives a selection from the user for a logical network to attach a VM. GUI 400 can display the status of the host assignment in a display area 404. In response to a host successfully being assigned to the logical network, GUI 400 can display a green check mark 414 to indicate the host assignment status 404 as assigned to logical network in 403. In one implementation, processing logic can consider the ability to access the hosts in the cluster subsequent to the interaction as indication that the attachment of the logical network to the VM completed successfully, and/or can consider the inability to access the host subsequent to the interaction as indication that the attachment of the logical network to the VM did not completed successfully.

Referring to FIG. 4B, the GUI 410 may display the host assignment status display area 404 as not accepted by a red X at 416 in response to a host interface selection process. For example, the network manager (e.g., 310 of FIG. 3) can attempt to assign a host (e.g., 341 of FIG. 3) to a logical network (e.g., 317 of FIG. 3) via an interface selection process and determine the host interfaces of the host (e.g., 346, 347, 348 of FIG. 3) to assign to the logical network. In this example, the network manager can send the status display via the GUI 410 to indicate a status of error as a X at 416. The GUI can also indicate which hosts of the cluster are assigned to the logical network with identified host interfaces via processing logic verses manual configuration.

In one implementation, status display area 404 and status indicators 414, 415, 416 present additional status information such as details of configuration information for the host, host interface, and/or network. For example, hovering over the status indicators 414, 415, 416 with a cursor can present additional information or instructions on attaching the logical network to VM. In one implementation, GUI 400 includes features to 'resolve' an assignment of the logical network to a host with no identified host interfaces. For example, a resolve button (not shown) can launch a dialog input for additional parameters to assign a host to the logical network in order to attach the VM. The user interface 400, 410 can include additional tools for the user to customize display, reporting, or configuration of multiple logical networks, VMs, hosts, host interfaces, and/or networks.

Figure 5:
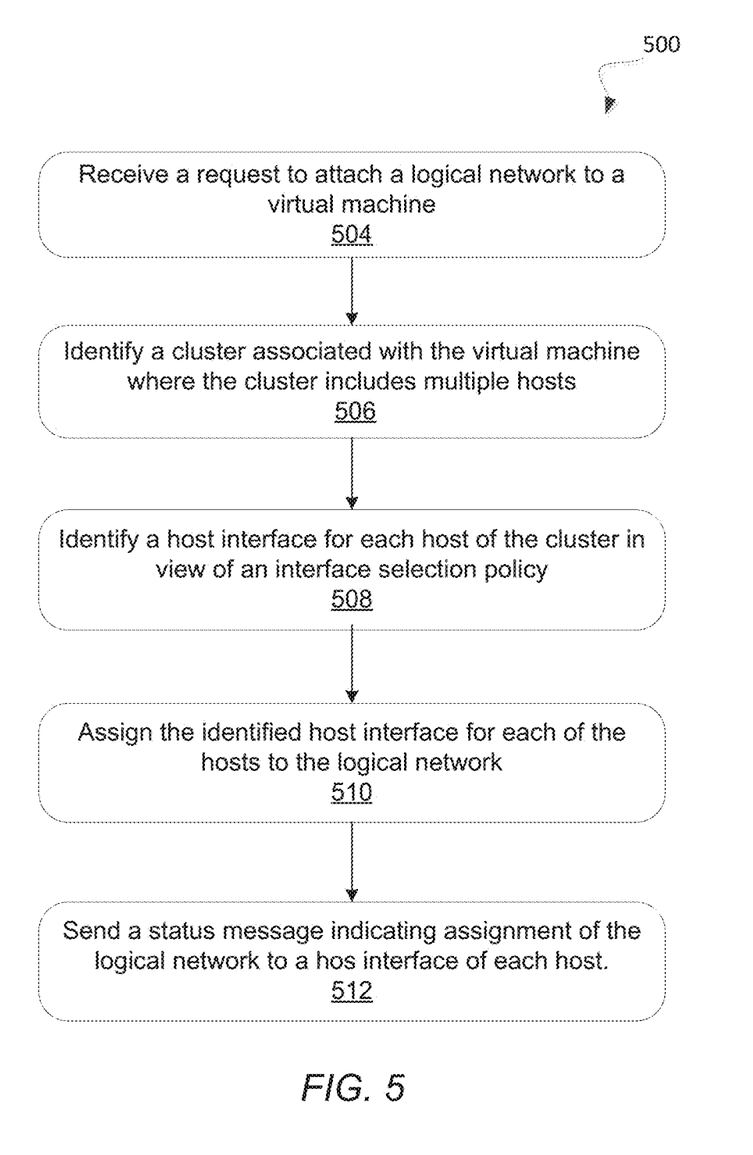
FIG. 5 is an illustrated example method to attach a logical network to a virtual machine in accordance with some implementations of the disclosure.

FIG. 5 is a flow diagram illustrating a method 500 for attaching a logical network to a VM. Method 500 can be performed by processing logic that includes hardware (e.g., circuitry, dedicated logic, programmable logic, microcode, etc.), software (such as instructions run on a processing device), or a combination thereof. As one example, the method can be performed by the network manager 110 running on the management server 102 of FIG. 1.

The method 500 may begin with the processing logic receiving, at block 504, a request to attach a logical network to a VM of a data center. For example, the data center includes a cluster of hosts. At block 506, the processing logic identifies the cluster associated with the VM. The cluster can include multiple hosts that are to be assigned to the logical network. All host of the cluster may further be identified. At block 508, the processing logic selects a host interface for each host in the cluster in view of an interface selection policy in view of one or more conditions. Examples of conditions of the interface selection policy include, but are not limited to, load balancing conditions, physical network conditions, and/or network configuration information as described above. At block 510, the processing logic assigns the identified host interface for each of the hosts to the logical network. At block 512, the processing logic sends a status message indicating the assignment of the logical network to each host.

As such, a request to attach a logical network to a virtual machine may be received. A cluster associated with the virtual machine may be identified. Furthermore, hosts of the cluster may be identified. Each host may include multiple host interfaces. The logical network may be attached to one of the host interfaces of each host based on an interface selection policy. For example, if a host interface of a host satisfies a condition of the interface selection policy, then the logical network may be assigned to the host interface. In some embodiments, an identified host interface that satisfies the conditions of the interface selection policy may be assigned to the logical network attached to the VM.

Figure 6:
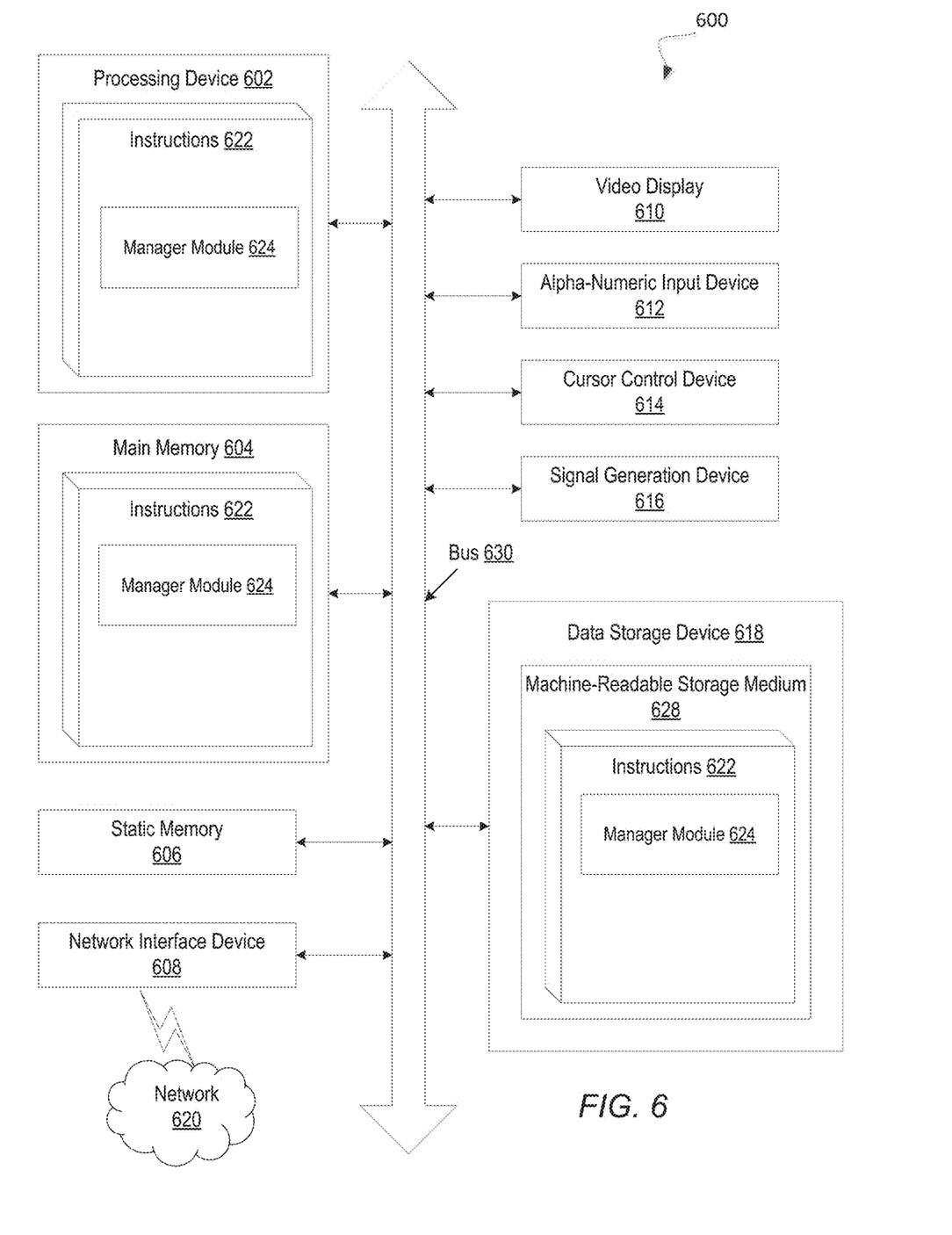
FIG. 6 illustrates a block diagram of an implementation of a computer system in which some implementations of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608 connected to one or more networks 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium (or more specifically a non-transitory computer-readable storage medium) 624 on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a manager module 624 (e.g., network manager 110 of FIG. 1 and/or network manager 310 of FIG. 3) and/or a software library containing methods that call network manager modules 624 or sub-modules in a network manager module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "identifying" or "selecting" or "assigning" or "attaching" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving, by a processing device of a management server, a request to attach a logical network to a virtual machine, the request received from a client device;
   identifying, by the processing device, a cluster associated with the virtual machine, wherein the cluster comprises a plurality of hosts;
   for each host of the plurality of hosts in the cluster:
      selecting, by the processing device, a host interface of the host in view of an operating characteristic of the host interface satisfying a condition of an interface selection policy;
      assigning, by the processing device, the selected host interface of the host to the logical network, wherein the assigning comprises storing a host interface identifier of the host interface with a virtual machine identifier of the virtual machine and a logical network identifier of the logical network in a data store maintained by the management server;
      providing, to the client device for each host of the plurality of hosts in the cluster, a status to indicate whether the assigning of the host interface to the logical network was accepted, the status comprising configuration information for the host, the host interface, and the logical network; and
      responsive to determining, by the processing device, that the status indicates that the assigning of the host interface was not accepted, sending an error status message to the client device, wherein the error status message comprises the configuration information for the host, the host interface, and the logical network, and providing a recommendation in view of the configuration information for the host, the host interface, and the logical network of the error status message.

2. The method of claim 1, further comprising selecting the host interface from a plurality of host interfaces of the host in view of a load balancing condition associated with the interface selection policy.

3. The method of claim 2, further comprising selecting the host interface from the plurality of host interfaces in view of network communication bandwidth of each of the plurality of host interfaces.

4. The method of claim 1, wherein selecting of the host interface further comprises:
   determining whether a first host interface of the host satisfies a condition of the logical network;
   responsive to the first host interface satisfying the condition of the logical network, identifying the first host interface as the host interface to assign to the logical network; and
   responsive to the first host interface not satisfying the condition of the logical network, identifying another host interface of the host as the host interface to assign to the logical network.

5. The method of claim 4, further comprising determining that the first host interface satisfies the condition in view of a logical network without a virtual local area network (VLAN) tag being assigned to the first host interface.

6. The method of claim 4, further comprising determining that the first host interface does not satisfy the condition in view of the logical network assigned to the first host interface to not support tagging.

7. The method of claim 1, wherein the logical network is newly created.

8. The method of claim 1, wherein the assigning further comprises:
   receiving an indicator that the host interface is not assigned to the logical network; and
   responsive to receiving the indicator, providing a resolution, in view of the interface selection policy, to complete a configuration of the host to accept the logical network.

9. The method of claim 1, wherein the operating characteristic comprises a history of network traffic and power consumption associated with a corresponding host.

10. A system comprising:
    a memory; and
    a processing device, operatively coupled to the memory, to:
       receive a request to attach a logical network to a virtual machine, the request received from a client device;
       identify a cluster associated with the virtual machine, wherein the cluster comprises a plurality of hosts;
       for each host of the plurality of hosts in the cluster:
          select a host interface of the host in view of an operating characteristic of the host interface satisfying a condition of an interface selection policy;
          assign the selected host interface of the host to the logical network, wherein the assigning comprises storing a host interface identifier of the host interface with a virtual machine identifier of the virtual machine and a logical network identifier of the logical network in a data store maintained by a management server;
          provide, to the client device for each host of the plurality of hosts in the cluster, a status to indicate whether the assigning of the host interface to the logical network was accepted, the status comprising configuration information for the host, the host interface, and the logical network; and
          responsive to determining that the status indicates that the assigning of the host interface was not accepted, send an error status message to the client device, wherein the error status message comprises the configuration information for the host, the host interface, and the logical network, and providing a recommendation in view of the configuration information for the host, the host interface, and the logical network of the error status message.

11. The system of claim 10, wherein the processing device is further to select the host interface from a plurality of host interfaces of the host in view of a load balancing condition associated with the interface selection policy.

12. The system of claim 11, wherein the processing device is further to select the host interface from the plurality of host interfaces in view of network communication bandwidth of each of the plurality of host interfaces.

13. The system of claim 10, wherein to select the host interface, the processing device is further to:
    determine that a first host interface of a plurality of host interfaces of the host satisfies a condition of the logical network;

responsive to the first host interface satisfying the condition of the logical network, identify the first host interface as the host interface to assign to the logical network; and responsive to the first host interface not satisfying the condition of the logical network, identify another host interface of the host as the host interface to assign to the logical network.

14. The system of claim 13, wherein the processing device is further to determine whether the first host interface satisfies the condition in view of a logical network being assigned to the first host interface without a virtual local area network (VLAN) tag.

15. The system of claim 13, wherein the processing device is further to determine that the first host interface does not satisfy the condition in view of the logical network assigned to the first host interface to not support tagging.

16. The system of claim 10, wherein the logical network is newly created.

17. A non-transitory computer readable storage medium comprising instructions, that when executed by a processing device, cause the processing device to:

receive, by the processing device of a management server, a request to attach a logical network to a virtual machine, the request received from a client device;

identify a cluster associated with the virtual machine, wherein the cluster comprises a plurality of hosts;

for each host of the plurality of hosts in the cluster:

select, by the processing device, a host interface of the host in view of an operating characteristic of the host interface satisfying a condition of an interface selection policy;

assign the selected host interface of the host to the logical network, wherein the assigning comprises storing a host interface identifier of the host interface with a virtual machine identifier of the virtual machine and a logical network identifier of the logical network in a data store maintained by the management server;

provide, to the client device for each host of the plurality of hosts in the cluster, a status to indicate whether the assigning of the host interface to the logical network was accepted, the status comprising configuration information for the host, the host interface, and the logical network; and responsive to determining that the status indicates that the assigning of the host interface was not accepted, send an error status message to the client device, wherein the error status message comprises the configuration information for the host, the host interface, and the logical network, and providing a recommendation in view of the configuration information for the host, the host interface, and the logical network of the error status message.

18. The non-transitory computer readable storage medium of claim 17, wherein the processing device is further to select the host interface from a plurality of host interfaces of the host in view of a load balancing condition associated with the interface selection policy.

19. The non-transitory computer readable storage medium of claim 18, wherein the processing device is further to select the host interface from the plurality of host interfaces in further view of network communication bandwidth of each of the plurality of host interfaces.

20. The non-transitory computer readable storage medium of claim 17, wherein to select the host interface, the processing device is further to:

determine whether a first host interface of a plurality of host interfaces of the host of the plurality of hosts satisfies a condition of the logical network;

responsive to the first host interface satisfying the condition of the logical network, identify the first host interface as the host interface to assign to the logical network; and responsive to the first host interface not satisfying the condition of the logical network, identify another host interface of the host as the host interface to assign to the logical network.

* * * * *